US008700599B2

(12) United States Patent
Udupa et al.

(10) Patent No.: US 8,700,599 B2
(45) Date of Patent: Apr. 15, 2014

(54) CONTEXT DEPENDENT KEYWORD SUGGESTION FOR ADVERTISING

(75) Inventors: Uppinakuduru Raghavendra Udupa, Mysore (IN); Santosh Raju Vysyaraju, Bangalore (IN)

(73) Assignee: Microsoft Corporation, Redmond, WA (US)

(*) Notice: Subject to any disclaimer, the term of this patent is extended or adjusted under 35 U.S.C. 154(b) by 125 days.

(21) Appl. No.: 13/300,678

(22) Filed: Nov. 21, 2011

(65) Prior Publication Data

US 2013/0132364 A1 May 23, 2013

(51) Int. Cl.
*G06F 17/30* (2006.01)

(52) U.S. Cl.
USPC ............ 707/709; 707/723; 707/728; 707/737

(58) Field of Classification Search
USPC ................... 707/709, 723, 728, 737
See application file for complete search history.

(56) References Cited

U.S. PATENT DOCUMENTS

| | | | |
|---|---|---|---|
| 7,548,929 B2* | 6/2009 | Collins et al. ..................... 1/1 |
| 2006/0116986 A1* | 6/2006 | Radcliffe ............................ 707/3 |
| 2006/0206516 A1 | 9/2006 | Mason |
| 2007/0143176 A1* | 6/2007 | Nong et al. ..................... 705/14 |
| 2008/0208841 A1* | 8/2008 | Zeng et al. ......................... 707/5 |
| 2008/0256039 A1 | 10/2008 | Chang et al. |
| 2009/0228353 A1* | 9/2009 | Achan et al. ................... 705/14 |
| 2009/0319508 A1* | 12/2009 | Yih et al. ........................... 707/5 |
| 2010/0161378 A1* | 6/2010 | Josifovski et al. ............. 705/10 |
| 2010/0191746 A1* | 7/2010 | Wang et al. ................... 707/750 |
| 2010/0241639 A1* | 9/2010 | Kifer et al. .................... 707/754 |
| 2010/0250335 A1* | 9/2010 | Cetin et al. ..................... 705/10 |
| 2011/0043652 A1* | 2/2011 | King et al. .................. 348/222.1 |
| 2011/0078193 A1* | 3/2011 | Chen et al. ..................... 707/780 |
| 2011/0167054 A1* | 7/2011 | Bailey et al. .................. 707/710 |
| 2011/0191338 A1* | 8/2011 | Hylton .......................... 707/731 |
| 2011/0191345 A1* | 8/2011 | Young ........................... 707/739 |
| 2011/0208708 A1 | 8/2011 | Liu et al. |
| 2011/0302172 A1* | 12/2011 | Chandrasekar et al. ....... 707/748 |
| 2012/0078711 A1* | 3/2012 | Mehta et al. ............... 705/14.45 |
| 2012/0158693 A1* | 6/2012 | Papadimitriou et al. ....... 707/708 |
| 2012/0233160 A1* | 9/2012 | Koomullil et al. ............ 707/728 |
| 2012/0290386 A1* | 11/2012 | Skinner ..................... 705/14.46 |

(Continued)

OTHER PUBLICATIONS

Chen, et al., "Advertising Keyword Suggestion Based on Concept Hierarchy", Retrieved at <<http://www.wsdm2009.org/wsdm2008.org/WSDM2008-papers/p251.pdf>>, Proceedings of the International Conference on Web Search and Web Data Mining, Feb. 11-12, 2008, pp. 251-260.
Joshi, et al., "Keyword Generation for Search Engine Advertising", Retrieved at <<http://ieeexplore.ieee.org/stamp/stamp.jsp?tp=&arnumber=4063677>>, Sixth IEEE International Conference on Data Mining—Workshops 2006, Dec. 2006, pp. 1-5.

(Continued)

*Primary Examiner* — Thanh-Ha Dang
(74) *Attorney, Agent, or Firm* — Steve Wight; Carole Boelitz; Micky Minhas

(57) ABSTRACT

Various technologies described herein pertain to suggesting context dependent keywords for advertising. A set of seed queries can be identified from a context, where the context is a source keyword, a search query, a category, or a landing page. Moreover, the set of seed queries can be inputted to a search engine. A predetermined number of web pages returned by the search engine upon executing the set of seed queries can be retrieved. Candidate keywords can be extracted from the web pages returned by the search engine. Further, keywords from the candidate keywords can be selected from the candidate keywords based on relevance scores of the candidate keywords.

16 Claims, 6 Drawing Sheets

(56) References Cited

U.S. PATENT DOCUMENTS

| | | | |
|---|---|---|---|
| 2012/0316972 A1* | 12/2012 | Hu et al. | 705/14.72 |
| 2012/0317101 A1* | 12/2012 | Jones et al. | 707/723 |
| 2012/0330978 A1* | 12/2012 | Yih et al. | 707/749 |
| 2013/0024474 A1* | 1/2013 | Kraft et al. | 707/770 |
| 2013/0097148 A1* | 4/2013 | Kon et al. | 707/709 |
| 2013/0110627 A1* | 5/2013 | Guha | 705/14.54 |

OTHER PUBLICATIONS

Ravi, et al., "Automatic Generation of Bid Phrases for Online Advertising", Retrieved at <<http://research.yahoo.com/files/wsdm246-ravi.pdf>>, Proceedings of the Third International Conference on Web Search and Web Data Mining, Feb. 4-6, 2010, pp. 1-10.

* cited by examiner

US 8,700,599 B2

CONTEXT DEPENDENT KEYWORD SUGGESTION FOR ADVERTISING

BACKGROUND

Various modes of online advertising and mobile advertising are conventionally employed to select and serve an advertisement to a user. Examples of the modes of advertising include sponsored search, contextual advertising, and ads-in-apps advertising. In sponsored search, advertisements are associated with one or more keywords; further, the advertisements can be chosen when a search query inputted by a user includes at least a subset of the keywords associated with the advertisement. In contextual advertising, advertisements are selected based on content displayed to a user; thus, text of a web page displayed to the user can be scanned for keywords, and advertisements can be returned to the web page (e.g., to be displayed on the web page, as a pop-up advertisement, etc.) based on what the user is viewing. Moreover, in ads-in-apps advertising, advertisements related to an application (e.g., an application executed on a mobile device) can be selected and displayed in the application. Such modes of advertising are commonly based on a keyword driven model.

In a keyword driven model, advertisers typically bid on keywords in an auction and associate advertisements with one or more keywords, which are referred to as bid phrases. Ad networks oftentimes identify keywords relevant to a given context of a user and select corresponding advertisements for display to the user. The context, for instance, can be a web page, a source keyword, a search query, or an application (e.g., a mobile application, etc.) depending on the mode of advertising.

Performance of advertisements and audience engagement with the advertisements can depend on relevance of the keywords to the context and relevance of the keywords to a product and/or service offered in the advertisement. Accordingly, an ability to identify relevant keywords from contexts impacts performance of the advertisements and the audience engagement. However, since the context available for online advertising and mobile advertising is usually a short piece of text ranging from a phrase to a web page, multiple relevant keywords are typically unable to be extracted from the context.

Some conventional advertising approaches that employ a keyword driven model identify keywords directly from a web page, a source keyword, a search query, or an application and attempt to match the identified keywords to bid phrases on which advertisers are bidding. Yet, since such approaches commonly obtain a small set of keywords, few advertisers oftentimes participate in an auction which can result in a limited pool of advertisements. Moreover, relevance of the advertisements served to a user can be detrimentally impacted by having the limited pool of advertisements.

SUMMARY

Described herein are various technologies that pertain to suggesting context dependent keywords for advertising. A set of seed queries can be identified from a context, where the context is a source keyword, a search query, a category, or a landing page. Moreover, the set of seed queries can be inputted to a search engine. A predetermined number of web pages returned by the search engine upon executing the set of seed queries can be retrieved. Candidate keywords can be extracted from the web pages returned by the search engine. For example, the relevance scores of the candidate keywords can be generated from clusters within a co-occurrence graph based on the candidate keywords. Further, keywords from the candidate keywords can be selected from the candidate keywords based on relevance scores of the candidate keywords. In some embodiments, the keywords selected from the candidate keywords can be re-ranked based on past performance data and bid data.

According to various embodiments, the set of seed queries can be generated from the context. For example, the set of seed queries can be generated from a landing page by extracting candidate keywords from text of the landing page. Pursuant to another example, the set of seed queries can be generated from a category using a category text based technique or an ad click through data based technique. With the category text based technique, the set of seed queries can be created by applying a set of rules to combine parent nodes and leaf nodes of the category. Moreover, the ad click through data based technique can create the set of seed queries by identifying, using ad click through data, search queries that correspond to phrases extracted from a leaf node of the category.

The predetermined number of web pages returned by the search engine can include web pages returned by the search engine from a database that includes semi-structured data and/or web pages returned by the search engine from the World Wide Web. In some embodiments, the candidate keywords can be extracted from the web pages returned by the search engine using a bid phrase dictionary. In other embodiments, the candidate keywords can be extracted from the web pages returned by the search engine using a stop word list.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
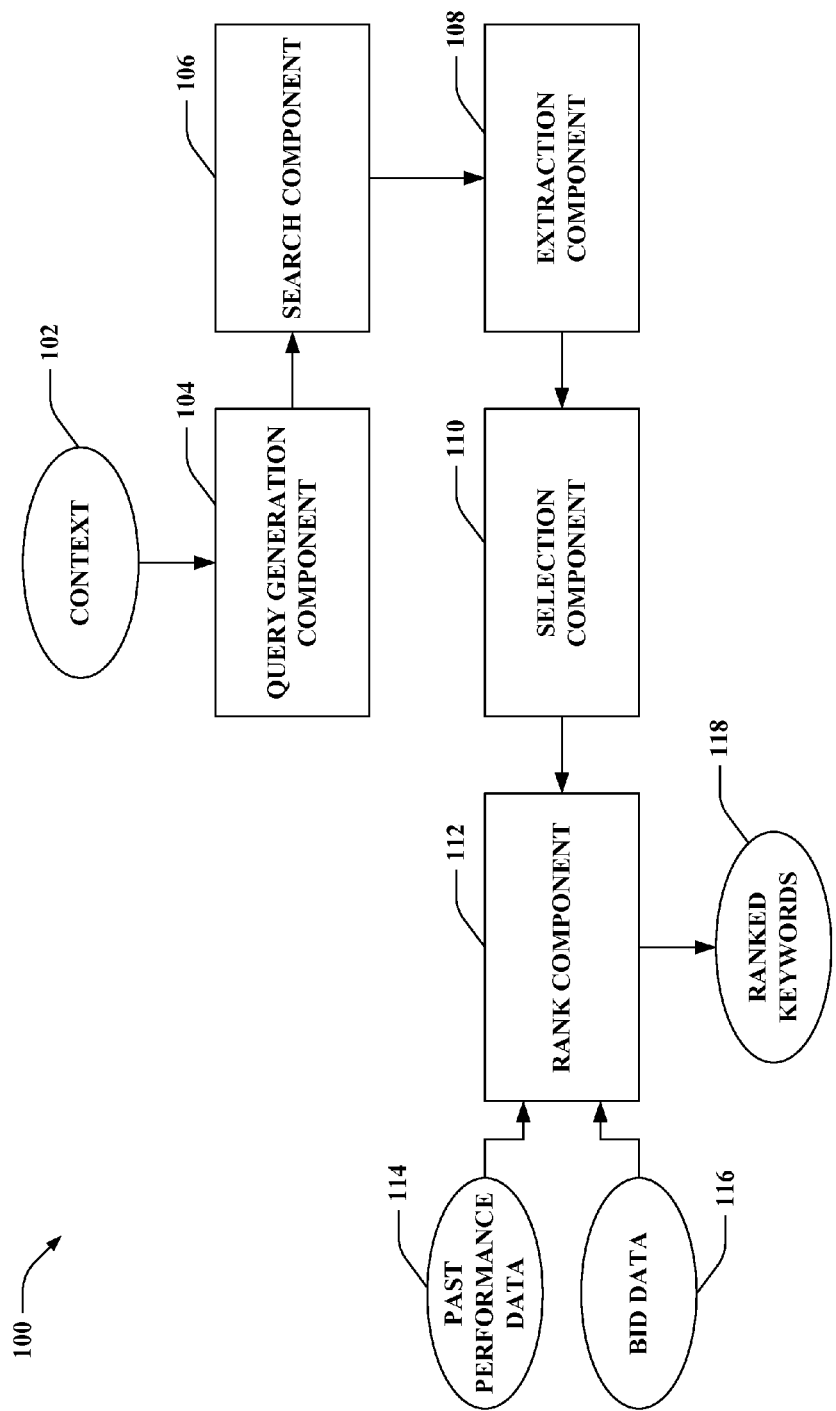
FIG. 1 illustrates a functional block diagram of an exemplary system that suggests context dependent keywords for advertising.

Various technologies pertaining to suggesting context dependent keywords for advertising are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As set forth herein, context dependent keywords can be suggested for advertising (e.g., online advertising, mobile advertising, etc.). Knowledge about a context can be obtained by pooling a collection of web pages related to the context. Accordingly, an expanded set of keywords related to a context (e.g., a source keyword, a search query, a category, a landing page, etc.) can be generated by extracting candidate keywords from the collection of web pages and choosing the keywords from the candidate keywords. In contrast to generating an expanded set of keywords, conventional techniques oftentimes obtain a small number of keywords directly from a source keyword, a search query, a web page, an application, or the like.

Referring now to the drawings, FIG. 1 illustrates a system 100 that suggests context dependent keywords for advertising. The system 100 provides a common framework for automatically suggesting keywords for different types of contexts. According, a context 102 can be inputted to the system 100. The context 102 can be a search query, a source keyword, a category, a landing page, or the like. While many of the examples set forth herein describe the context 102 as being a search query, a source keyword, a category, or a landing page, it is to be appreciated that the context 102 can be a plurality of search queries, a plurality of source keywords, a plurality of categories, or a plurality of landing pages.

The context 102 inputted to the system 100 can be dependent upon a mode of advertising (e.g., sponsored search, contextual advertising, ads-in-aps advertising, etc.) being employed. For example, when sponsored search is employed, the context 102 inputted to the system 100 can be a search query. In sponsored search, advertisements can be selected based on their relevance to the user supplied search query, which can be achieved by identifying keywords relevant to the search query. According to another example, when contextual advertising is employed, the context 102 inputted to the system 100 can be a source keyword. In contextual advertising, source keywords obtained from a publisher page (or other source) can be expanded to related keywords as set forth herein. Pursuant to a further example, when ads-in-apps advertising is employed, the context 102 inputted to the system 100 can be a category. Web pages or applications can be classified into one or more pre-defined categories and keywords can be suggested based on the category. For instance, in mobile ads-in-aps advertising, an application can be associated with a category and advertisements for the application can be selected using keywords relevant for the category. In accordance with another example, a landing page can be a web page that appears after an advertisement is clicked by a user. The landing page can include information about a product and/or service that is being advertised. While preparing ad campaigns, advertisers commonly provide a set of bid phrases related to the product and/or service along with the advertisements. The landing page can serve as the context for automatically suggesting bid phrases for the advertisers. However, it is to be appreciated that the claimed subject matter is not limited to the foregoing examples.

The context 102 can be acquired by the system 100 in various manners. According to an illustration, a search query entered by a user can be received by the system 100 (e.g., the search query can be supplied to a search engine by the user). Pursuant to another illustration, a source keyword can be obtained from a publisher page (or different source). Following this illustration, the system 100 can scan text of the publisher page for the source keyword. By way of a further illustration, a category can be identified by the system 100 based upon a web page or application rendered on a display (e.g., a category in which the web page or application is classified can be recognized). In accordance with yet another illustration, a landing page can be inputted to the system 100. It is contemplated, however, that the claimed subject matter is not limited to the aforementioned illustrations.

A query generation component 104 can obtain the context 102. Moreover, the query generation component 104 can identify a set of seed queries from the context 102. The set of seed queries outputted by the query generation component 104 can include a single seed query or a multiple seed queries. Depending upon a type of the context 102, the query generation component 104 can employ different techniques to generate the set of seed queries from the context 102.

According to an example, the context 102 inputted to the query generation component 104 can be a search query. Following this example, the query generation component 104 can use the search query as the seed query without further processing.

By way of another example, the context 102 inputted to the query generation component 104 can be a source keyword. Accordingly, the query generation component 104 can use the source keyword as the seed query without further processing.

In accordance with a further example, the context 102 inputted to the query generation component 104 can be a landing page from which the set of seed queries can be identified. The landing page can be a web page displayed after an advertisement is clicked by a user. The query generation component 104 can extract candidate keywords from the landing page. Alternatively, (although not shown) it is contemplated that a disparate component (e.g., an extraction component 108) can extract the candidate keywords from the landing page. For instance, the candidate keywords can be extracted from text of the landing page using candidate extraction algorithms discussed herein. Moreover, the query generation component 104 can rank the candidate keywords extracted from the landing page. According to an example, the query generation component 104 can evaluate a metric, such as a TFIDF (term frequency-inverse document frequency) score, for the candidate keywords extracted from the landing page; the evaluated metric can be used to rank the candidate keywords extracted from the landing page. However, it is to be appreciated that other metrics for ranking the candidate keywords are intended to fall within the scope of the hereto appended claims. Further, the query generation component 104 can select a top preset number of the candidate keywords extracted from the landing page as ranked as the seed queries. Pursuant to an example, the top preset number of candidate keywords can be a top ten candidate keywords as ranked; yet, the claimed subject matter is not so limited.

In accordance with another example, the context 102 inputted to the query generation component 104 can be a category from which the set of seed queries can be identified. For instance, a web page or an application can be classified in the category. A category is a short piece of text that includes multiple levels and represents a node in a topic hierarchy. Each level can represent a node in the topic hierarchy, and granularity of the topic increases from left to right in the category. The query generation component 104 can generate a set of seed queries from the category using a category text based technique or an ad click through data based technique, for instance; yet, the claimed subject matter is not so limited.

If the category text based technique is implemented by the query generation component 104 for generating the set of seed queries from the category, then the seed queries can be formed by combining parent nodes and leaf nodes of the category. The query generation component 104 can pre-process the category. When pre-processing the category, each level in the category can be converted into a sequence of terms. By way of illustration, an underscore can be replaced with a space, an "&" can be replaced with the term "and", and so forth. Further, as part of the pre-processing, the query generation component 104 can discard a subset of the levels if the category includes more than three levels. For example, a three level category can be in the form "A/B/C", and levels need not be discarded from such a category. Alternatively, if a category includes more than three levels, then the last three levels can be selected by the query generation component 104 while the other levels in the category can be discarded during pre-processing by the query generation component 104. Thus, if the category has five levels in the form "X/Y/A/B/C", then "A/B/C" can be selected and "X/Y" can be discarded.

Moreover, when employing the category text based technique, the query generation component 104 can use a set of rules to form the set of seed queries (e.g., Seed_Queries) from the pre-processed category. An example set of rules that can be implemented on a three level pre-processed category in the form "A/B/C" is set forth in the pseudocode below; however, it is to be appreciated that other sets of rules are intended to fall within the scope of the hereto appended claims.

```
Seed_Queries = [ ]
IF Length(C) == 2
    Add "C" to Seed_Queries
ELSE IF Length(C) > 2 terms
    Add C to Seed_Queries
ENDIF
IF Length(B) == 1 AND Length(C) == 1
    Add "B" "C" to Seed_Queries
ELSE
    Add "C" "B" to Seed_Queries
ENDIF
IF Length(C) <= 2 AND Length(A) <= 2
    Add "C" "A" to Seed_Queries
ELSE IF Length(C) <= 2 Length(A) > 2
    Add "C" A to Seed_Queries
ELSE IF Length(C) > 2 AND Length(A) <= 2 terms
    Add C "A" to Seed_Queries
ELSE IF Length(C) > 2 AND Length(A) > 2
    Add C A to Seed_Queries
ENDIF
```

Additionally, a spaced, separated concatenation of C, B, A, in such order, can be added as a seed query (e.g., added to Seed_Queries), where quotes can be used for levels with Length <=2. For example, if Length(C) <=2, Length(B) <=2, and Length(A) >2, then the seed query added according to this rule is "C" "B" A.

Moreover, the Length function outputs a number of words in an input string. For example, if "Books" is inputted, then the Length function would return 1. According to another example, if "Books and Literature" is inputted, then the Length function would return 3.

By way of illustration, the category "Books_&_Literature/Nonfiction/Vehicles" can be inputted to the query generation component 104. If employing the category text based technique, then the query generation component 104 can pre-process the category to produce "Books and Literature/Nonfiction/Vehicles". Moreover, the query generation component 104 can employ the aforementioned set of rules to generate the set of seed queries. For instance, "Books and Literature" (e.g., A), "Nonfiction" (e.g., B), and "Vehicles" (e.g., C) can be inputted to the Length function, which can return 3, 1, and 1, respectively. Thus, since the number of words in B equals 1 and the number of words in C equals 1, a first seed query ("Nonfiction" "Vehicles") can be included in the set of seed queries. Moreover, since the number of words in C is less than or equal to 2 and the number of words in A is greater than 2, a second seed query ("Vehicles" Books and Literature) can be included in the set of seed queries. Further, since the number of words in C is less than or equal to 2, the number of words in B is less than or equal to 2, and the number of words in A is greater than 2, a third seed query ("Vehicles" "Nonfiction" Books and Literature) can be included in the set of seed queries. It is to be appreciated, however, that the foregoing illustration is provided as an example, and the claimed subject matter is not so limited.

Alternatively, the query generation component 104 can implement the ad click through data based technique to generate the set of seed queries from the category. Accordingly, the query generation component 104 can extract phrases from a leaf node of the category (e.g., using a set of rules). By way of example, if the category "Science/Engineering_&_Technology/Aerospace_&_Defense_Engineering" is inputted, the query generation component 104 can extract the following set of phrases from the leaf node (e.g., "Aerospace_&_Defense_Engineering"): "aerospace engineering", "defense engineering", "aerospace", "defense". Pursuant to another example, if the category "Lawn_&_Garden/Swimming_Pool_&_Spa_Supplies" is inputted, the query generation component 104 can extract the following set of phrases from the leaf node (e.g., "Swimming_Pool_&_Spa_Supplies"): "swimming pool and spa supplies", "swimming pool supplies", "spa supplies", "spa", "swimming pool".

The phrases extracted from the leaf node of the category can be used by the query generation component 104 to identify corresponding search queries. The query generation component 104 can identify search queries that correspond to the phrases based on ad click through data, where the ad click through data includes search query—bid phrase pairs and corresponding numbers of clicks for the pairs. The ad click through data can be included in a sponsored search ad click log. Further, the phrases extracted from the leaf node of the category can be used to mine high volume search queries. Entries in the ad click through data having corresponding numbers of clicks below a threshold (e.g., 3, an integer less than 3, an integer greater than 3) can be filtered out by the query generation component 104. Moreover, the query generation component 104 can select, as the seed queries in the set, a preset number of the search queries that correspond to the phrases based on the corresponding number of clicks. Thus, for each phrase extracted from the leaf node of the category, the query generation component 104 can identify corresponding search queries and a top preset number (e.g., 10, an integer less than 10, an integer greater than 10) of the search queries can be selected.

The set of seed queries produced by the query generation component 104 can be inputted to a search component 106. According to an example, the search component 106 can be a search engine. The search component 106 can execute a search based upon the set of seed queries. Moreover, the search component 106 can return a predetermined number of web pages upon executing the set of seed queries. Thus, the search component 106 can perform a search for each of the seed queries in the set. Further, a predetermined number of web pages can be returned by the search component 106 for each of the searches.

The search component 106 returns web pages upon executing the set of seed queries. The search component 106 can use the seed queries to search for web pages on the World Wide Web. Additionally or alternatively, the search component 106 can use the seed queries to search for web pages in a database that includes semi-structured data. For instance, the search component 106 can return web pages from the database that includes semi-structured data and web pages from the World Wide Web. According to an example, the predetermined number of web pages returned by the search component 106 upon executing a seed query can include ten web pages from the database that includes semi-structured data and one hundred web pages from the World Wide Web; however, it is to be appreciated that any other numbers of returned web pages are intended to fall within the scope of the hereto appended claims. By way of another example, results returned by the search component 106 can be restricted to a specific market in order to provide market specific suggestions.

Moreover, an extraction component 108 can retrieve the predetermined number of web pages returned by the search component 106 upon executing the set of seed queries. The extraction component 108 can extract candidate keywords from the web pages returned by the search component 106. The extraction component 108 can parse the web pages returned by the search component 106 (e.g., using an HTML parser) and extract text from the web pages. The text can be split on sentence boundaries and new lines, for instance. Moreover, the extraction component 108 can tokenize the text from the web pages to obtain respective sequences of tokens for each of the web pages (e.g., respective sequences of words for each of the web pages, etc.). For example, the extraction component 108 can include and/or employ a tokenizer (not shown) to tokenize the text. Following this example, language specific tokenizers can be utilized depending upon the language of the context 102. Moreover, for languages such as Chinese that lack word separations in the text, the extraction component 108 can further include and/or utilize a word breaker (not shown) to split the text into words.

Further, the extraction component 108 can select the candidate keywords from the respective sequences of tokens. According to an example, the extraction component 108 can use a bid phrase dictionary to select the candidate keywords from the respective sequences of tokens. By way of yet another example, the extraction component 108 can utilize a stop word list to select the candidate keywords form the respective sequences of tokens. It is to be appreciated, however, that the claimed subject matter is not limited to the foregoing examples.

According to an example, the extraction component 108 can use a stop word list to extract the candidate keywords from the web pages returned by the search component 106. The stop word list can include a set of most common words in a given language. Thus, the stop word list for English can include common words such as "is", "he", "of", etc. Further, if the context 102 is in a language other than English, then a stop word list for the language other than English is utilized by the extraction component 108.

The extraction component 108 can scan tokens from left to right when extracting candidate keywords using the stop word list. For each token in the respective sequences of tokens, the extraction component 108 can identify whether the token is included in the stop word list. The token can be discarded when the token is identified as being included in the stop word list. Thus, if the token is a stop word, such token is discarded and the extraction component 108 moves to a next token. Otherwise, when the token is identified as being omitted from the stop word list, possible phrases that start with the token can be formed by the extraction component 108. The extraction component 108 can form possible phrases that include two to four tokens, for example; however, the claimed subject matter is not so limited as other possible phrase lengths are intended to fall within the scope of the hereto appended claims. Moreover, the extraction component 108 can discard the possible phrases having a last token that is included in the stop word list. Further, the extraction component 108 can select the candidate keywords from the possible phrases that remain for the respective sequences. Pursuant to an example, the extraction component 108 can further refine the set of possible phrases from which the candidate keywords are selected if a web N-Gram corpus is available. Thus, possible phrases having web N-Gram scores below a threshold can be filtered out by the extraction component 108; yet, it is contemplated that the claimed subject matter is not so limited. According to another example, the extraction component 108 can use a stop phrase list to filter out common and non-informative phrases such as, for instance, "best price", "free shipping", etc. from the possible phrases. Similar to the stop word list, if the context 102 is in a language other than English, then a stop phrase list for the language other than English can be employed by the extraction component 108.

By way of another example, the extraction component 108 can extract the candidate keywords from the web pages returned by the search component 106 using a bid phrase dictionary. A bid phrase dictionary is a collection of keywords bid on by advertisers. According to this example, the candidate keywords extracted by the extraction component 108 are restricted to appearing in the bid phrase dictionary, resulting in candidate keywords that are valid phrases and well formed.

The extraction component 108 can scan tokens from left to right when extracting candidate keywords using the bid phrase dictionary. For each token in the respective sequence of tokens, the extraction component 108 can form a possible phrase starting with the token. For example, a possible phrase having a first length (e.g., length of 4, substantially any other length, etc.) can initially be considered. The extraction component 108 can identify whether the possible phrase is included in the bid phrase dictionary. When the possible phrase is identified as being included in the bid phrase dictionary, the extraction component 108 can select the possible phrase for inclusion in the candidate keywords. Additionally, when the possible phrase is identified as being included in the bid phrase dictionary, the extraction component 108 can move to a token that appears after the possible phrase. Alternatively, when the possible phrase is identified as being omitted from the bid phrase dictionary, the extraction component 108 can either form a disparate possible phrase starting with the token having a shorter length or move to a next token to form a different possible phrase. For instance, a disparate possible phrase starting with the token can have a length decreased by one token compared to a previously considered possible phrase starting with the token (e.g., decrease the length from 4 to 3, from 3 to 2, etc.). Creating shorter possible phrases that start with the token can continue until a valid bid phrase is found (e.g., the disparate possible phrase is identified as being included in the bid phrase dictionary) or a phrase length is two. Accordingly, if no valid phrase is found, the extraction component 108 can move to the next token to form the different possible phrase.

A selection component 110 can select keywords from the candidate keywords extracted by the extraction component 108 based on relevance scores of the candidate keywords. It can be assumed that topically related keywords appear in multiple web pages and co-occur more than other candidate keywords. The selection component 110 can apply a graph clustering technique to mine for the keywords from the candidate keywords. For instance, the selection component 110 can construct a co-occurrence graph based on the candidate keywords. In the co-occurrence graph, vertices respectively represent the candidate keywords and edges between the vertices respectively represent co-occurrence of candidate keyword pairs. The selection component 110 can attempt to find dense cluster(s) of keywords from the co-occurrence graph. Moreover, the selection component 110 can generate the relevance scores from clusters within the co-occurrence graph, which is based on the candidate keywords.

Let G: (V,E) be a weighted undirected co-occurrence graph constructed by the selection component 110, with each vertex (V) representing a candidate keyword and edges (E) representing a co-occurrence of candidate keywords in the related web pages. Weight of an edge $w_{ij}$ between two vertices $v_i$ and $v_j$ is defined as the number of web pages in which the candidates represented by $v_i$ and $v_j$ co-occur. Thus, an edge appears between all pairs of candidate keywords that co-occur in at least one web page.

The selection component 110 can remove a subset of the edges having weights below a threshold weight (e.g., $w_{min}$) to form sub-graphs. Such removal of the subset of the edges can remove weak edges, and can provide that the remaining associations between candidate keywords are strong. Moreover, isolated vertices that result after the removal of the subset of the edges can be discarded. One or more sub-graphs can be formed, where a sub-graph can include a subset of the candidate keywords.

Figure 2:
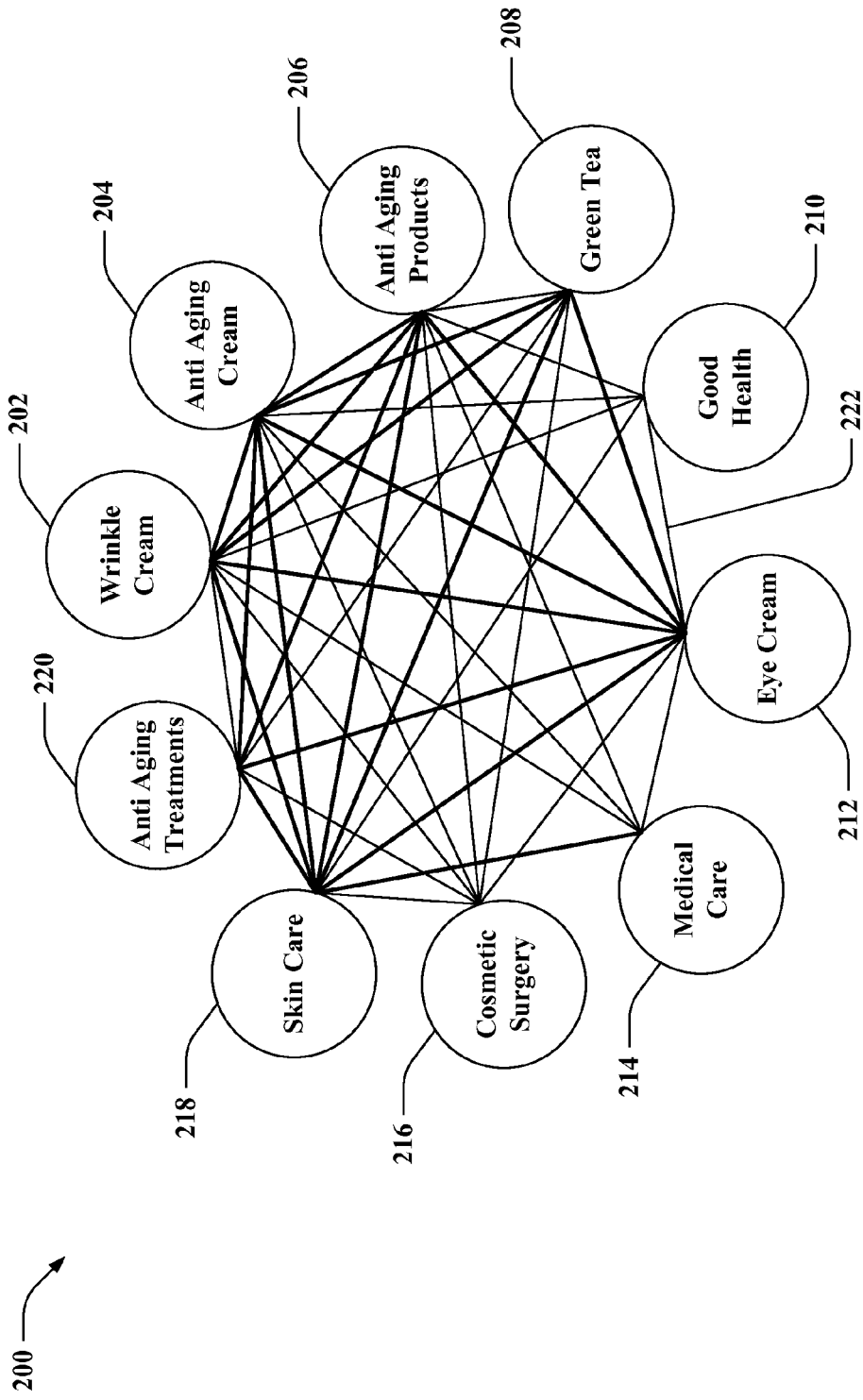
FIG. 2 illustrates an exemplary sub-graph from a co-occurrence graph.

With reference to FIG. 2, illustrated is an exemplary sub-graph 200 from a co-occurrence graph. It is to be appreciated that the sub-graph 200 is presented for illustration purposes, and the claimed subject matter is not so limited. The sub-graph 200 includes ten vertices: a vertex 202 that represents "wrinkle cream", a vertex 204 that represents "anti aging cream", a vertex 206 that represents "anti aging products", a vertex 208 that represents "green tea", a vertex 210 that represents "good health", a vertex 212 that represents "eye cream", a vertex 214 that represents "medical care", a vertex 216 that represents "cosmetic surgery", a vertex 218 that represents "skin care", and a vertex 220 that represents "anti aging treatments" (collectively referred to as vertices 202-220).

Moreover, the sub-graph 200 includes edges between vertices that have weights above the threshold. For example, an edge 222 is between the vertex 210 and the vertex 212. A weight of the edge 222 corresponds to the number of web pages in which "good health" and "eye cream" co-occur, for instance.

Again, reference is made to FIG. 1. The selection component 110 can further detect a subset of the sub-graphs with corresponding sub-graph densities above a threshold density. The selection component 110 can compute a sub-graph density (SD) of a sub-graph (e.g., the sub-graph 200 of FIG. 2) as follows:

$$SD = \sum_{v_i \in V} \sum_{v_j \in V - \{v_i\}} \{w_{ij} - w_{min}\}$$

Sub-graphs having a SD value above the threshold density can be considered as dense. According to an example, the threshold density can be 3; however, it is to be appreciated that any other threshold is intended to fall within the scope of the hereto appended claims.

Once the dense sub-graphs are identified (e.g., the subset of the sub-graphs with corresponding sub-graphs densities above the threshold density), the candidate keywords in each dense sub-graph respectively can be designated as topically related keywords. Moreover, the selection component 110 can evaluate the relevance scores of candidate keywords represented by vertices in the subset of the sub-graphs. Further, the selection component 110 can select the keywords from the candidate keywords represented by the vertices in the subset of the sub-graphs based on the relevance scores. Thus, candidate keywords from the dense sub-graphs can be sorted based on a relevance score and a top N candidates can be selected as the keywords, where N can be substantially any integer (e.g., N can be an integer between 3 and 10). Moreover, a relevance score of a given candidate keyword can be a sum of discounted weights from a vertex that represents the given candidate keyword. Thus, the selection component 110 can compute a relevance score of a candidate keyword at a vertex $v_i$ as follows:

$$\text{Score} = \sum_{v_j \in V - \{v_i\}} \{w_{ij} - w_{min}\}$$

The system 100 further includes a rank component 112 that can re-rank the keywords chosen by the selection component 110. The rank component 112 can re-rank the keywords based on past performance data 114 and bid data 116. The past performance data 114 and/or the bid data 116 can be used by the rank component 112 to calculate a performance measure based score, a relevance score, and a bid density score for the keywords. Thereafter, the rank component 112 can re-rank the keywords as a function of the performance measure based score, the relevance score, and the bid density score for the keywords. Moreover, the rank component 112 can output the ranked keywords 118.

The keywords outputted by the selection component 110 can be ranked according to relevance. However, such ranking may not capture the monetization value and audience engagement potential of the corresponding advertisements. Accordingly, the rank component 112 can use the past performance data 114 and the bid data 116 to estimate the monetization value and audience engagement potential for the keywords. The rank component 112 can implement a ranking function that prefers keywords that have performed well in the past and are bid heavily. Note that the past performance data 114 and the bid data 116 typically is taken from the same market for which the rank component 112 is optimizing the ranked keywords 118.

As set forth above, the rank component 112 can re-rank the keywords as a function of the performance measure based score, the relevance score, and the bid density score for the keywords. The ranking function can be a product of the foregoing scores. More particularly, the following performance measures can be used: click-through rate (CTR)=clicks/impressions; cost per 1000 impressions (CPM)=(revenue*1000)/impressions; and bid density=number of distinct bids on a keyword. In the foregoing, clicks equals a number of clicked advertisements that were matches from the keyword and impressions equals a number of times advertisements are displayed following a match with the keyword.

CTR denotes a percentage of clicks obtained for a particular keyword and represents an interest of an audience in the advertisements. CPM denotes revenue earned per 1000 impressions of advertisements originating from the keyword. Bid density denotes a popularity of the keyword among the advertisers.

Values of CTR, CPM, and bid density can have differing orders of magnitude. Accordingly, the rank component 112 can normalize the CTR, CPM, and bid density values to fall in a range of [0,1].

Moreover, the rank component 112 can generate a relevance score, referred to as relevance, by directly mapping a rank of a keyword outputted by the selection component 110 to a value between 0 and 1. For example, keywords appearing in a top 5 positions as outputted by the selection component 110 can be assigned a relevance of 1 by the rank component 112, keywords in positions 6-10 can be assigned a relevance of 0.75 by the rank component 112, and so forth.

The rank component 112 can employ the following ranking function to compute a rank of a keyword (R(kw)):

$$R(kw) = RevScore * RelScore * DensityScore$$

The performance measures based score (RevScore), the relevance score (RelScore), and the bid density score (DensityScore) in the foregoing function can be evaluated as follows:

$$RevScore = RevWeight * \left(\frac{normCTR + normCPM}{2}\right) + (1 - RevWeight)$$

$$RelScore = RelWeight * relevance + (1 - RelWeight)$$

$$DensityScore = DensityWeight * normDensity + (1 - DensityWeight)$$

As set forth above, normCTR, normCPM, and normDensity are normalized CTR, normalized CPM, and normalized bid density, respectively. Further, RevWeight, RelWeight, and DensityWeight are weights for different scores that can have values in the range [0,1]. According to an example, the RevWeight, RelWeight, and/or DensityWeight can be adjusted to reduce or increase the impact of each of the scores, respectively.

According to an example, an advertisement can be selected for display based on the ranked keywords 118 (e.g., the advertisement can be selected to be served based on the ranked keywords 118). By way of another example, an advertisement can be selected for display based on the keywords outputted by the selection component 110 (e.g., the keyword need not be re-ranked by the rank component 112 and thus can be ranked according to relevance). However, it is to be appreciated that the claimed subject matter is not limited to the foregoing examples.

The system 100 can be adaptable for new markets and languages. If the context 102 is in a language other than English, the system 100 can extract keywords in such language. Various language specific resources can be employed by the system 100. For example, the language specific resources can include a tokenizer (e.g., included in or used by the extraction component 108) that breaks the text into sequences of tokens (e.g., words). Further, for languages such as Chinese which do not have word separations in the text, a word breaker can be used to split the text into words. Moreover, the language specific resources can include a list of language specific stop words and a list of language specific stop phrases (e.g., non-informative phrases) that can be used by the extraction component 108 if the extraction component 108 utilizes a stop word list to extract candidate keywords. Additionally or alternatively, the language specific resources can include language specific bid phrase dictionaries if the extraction component 108 utilizes a bid phrase dictionary to extract candidate keywords.

Further, the system 100 can use market specific resources such as bid phrase dictionaries, the past performance data 114, the bid data 116, and/or web search results for a given market (e.g., returned by the search component 106). Further, if the system 100 is suggesting keywords for a new market, market specific data typically is used. For example, while suggesting keywords for the United States and the United Kingdom markets, the language specific resources can remain the same but the market specific data associated with the respective markets can be used.

Figure 3:
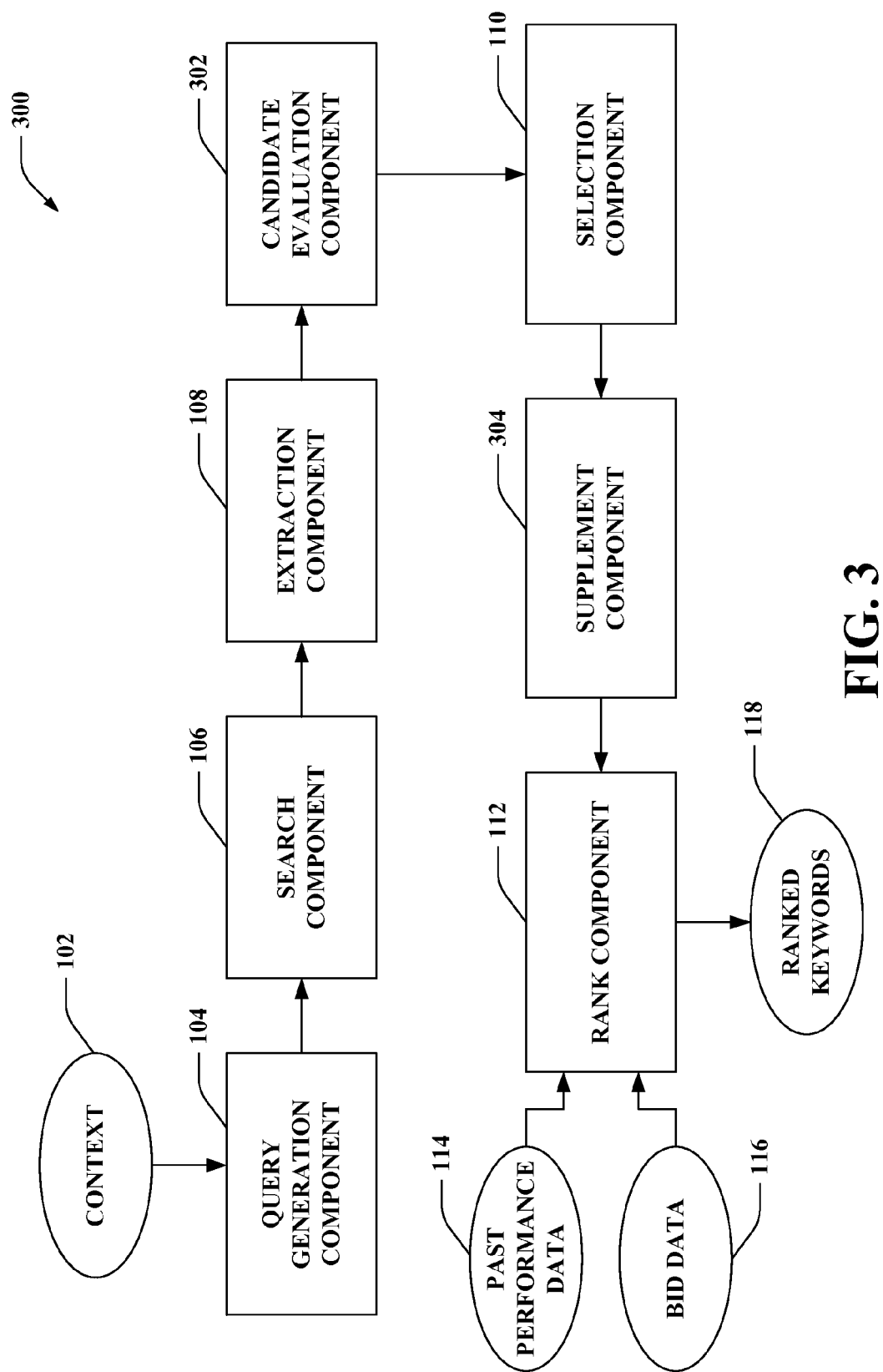
FIG. 3 illustrates a functional block diagram of another exemplary system that suggests context dependent keywords for advertising.

Now referring to FIG. 3, illustrated is another exemplary system 300 that suggests context dependent keywords for advertising. The system 300 includes the query generation component 104, the search component 106, the extraction component 108, the selection component 110, and the rank component 112. The system 300 further includes a candidate evaluation component 302 that can receive the candidate keywords extracted by the extraction component 108 from the web pages returned by the search component 106. The candidate evaluation component 302 can analyze the candidate keywords and remove a subset of the candidate keywords that lack lexical similarity with the seed queries in the set generated by the query generation component 104. Further, the candidate evaluation component 302 can provide the remaining candidate keywords to the selection component 110.

In order to mitigate noisy candidate keywords and to provide that the candidate keywords are semantically related to the context 102, the candidate evaluation component 302 can restrict candidate keywords provided to the selection component 110. The candidate evaluation component 302 can allow a candidate keyword if it has at least one term in common with at least one seed query produced by the query generation component 104. For example, for a set of seed queries {"nursing", "nursing careers"}, the candidate evaluation component 302 can determine that "nursing schools" is a valid candidate keyword since it includes the term "nursing", which is also present in the seed queries. Following this example, the candidate evaluation component 302 can filter out "online jobs" since both "online" and "jobs" do not appear in any of the seed queries in the set.

It is to be appreciated that the candidate evaluation component 302 can optionally impose the lexical similarity constraint on the candidate keywords (e.g., as a function of the type of the context 102). For instance, when a small number of seed queries are generated by the query generation component 104, lexical similarity may result in few candidate keywords being inputted to the selection component 110. However, if a larger number of seed queries are generated by the query generation component 104 (e.g., in the case of the context 102 being a category), lexical similarity may result in a sufficient number of candidate keywords being inputted to the selection component 110.

Moreover, the system 300 includes a supplement component 304 that can generate supplemental keywords based on the keywords selected by the selection component 110 from the candidate keywords. For instance, the graph clustering technique employed by the selection component 110 can select a number of keywords (e.g., the selection component 110 can output 10 to 20 keywords, etc.). For some applications, however, it may be desirable to have a larger number of keywords (e.g., a few hundred keywords), which can provide advertisers with more options for selection. Accordingly, the supplement component 304 can create a larger set of relevant keywords by selecting bid phrases from a bid phrase dictionary that are semantically related to the keywords selected from the candidate keywords.

By way of example, each keyword outputted by the selection component 110 can be expanded by the supplement component 304 into a set of candidates. This set can be obtained by taking a top number (e.g., 100) of bid phrases in the bid phrase dictionary which share common terms with the keyword outputted by the selection component 110. It is contemplated scoring methods such as TFIDF, BM-25, etc. can be used to find the top candidates.

Further, the candidates in the obtained set for a keyword need not be semantically related. For example, "Utah basketball" may get candidates, such as "Utah jobs", which have terms in common but are not related. To filter such candidates, the supplement component 304 can create a term frequency vector from web search snippets of each candidate and compare such term frequency vectors for the candidates against a corresponding term frequency vector for the keyword. A similarity score such as cosine similarity can be computed by the supplement component 304, and candidates having scores below a threshold can be removed by the supplement component 304. Moreover, candidates that remain can be used as the keywords, which can be inputted to the rank component 112, for example.

Figure 4:
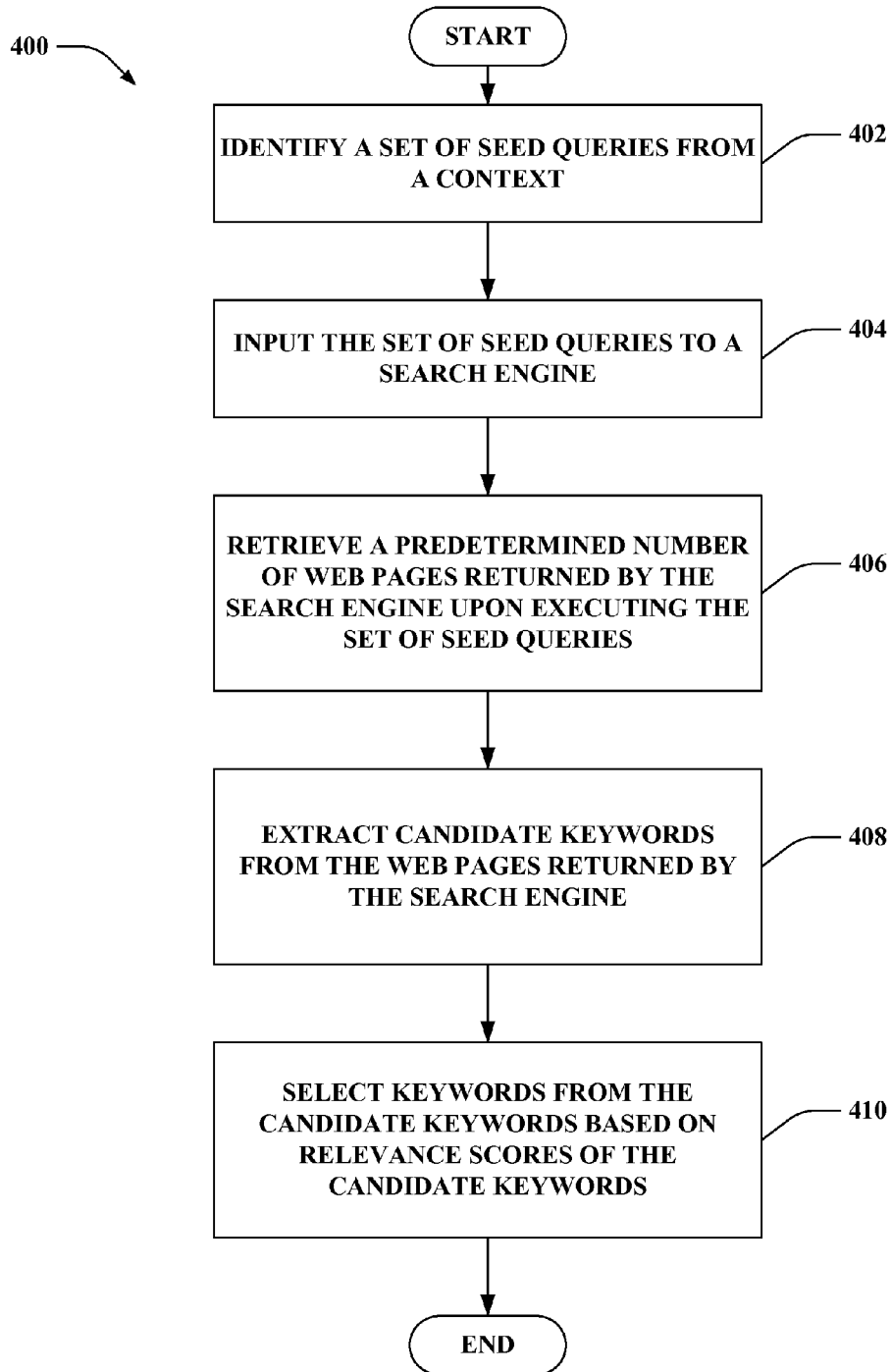
FIG. 4 is a flow diagram that illustrates an exemplary methodology of identifying context dependent keywords for advertising.
Figure 5:
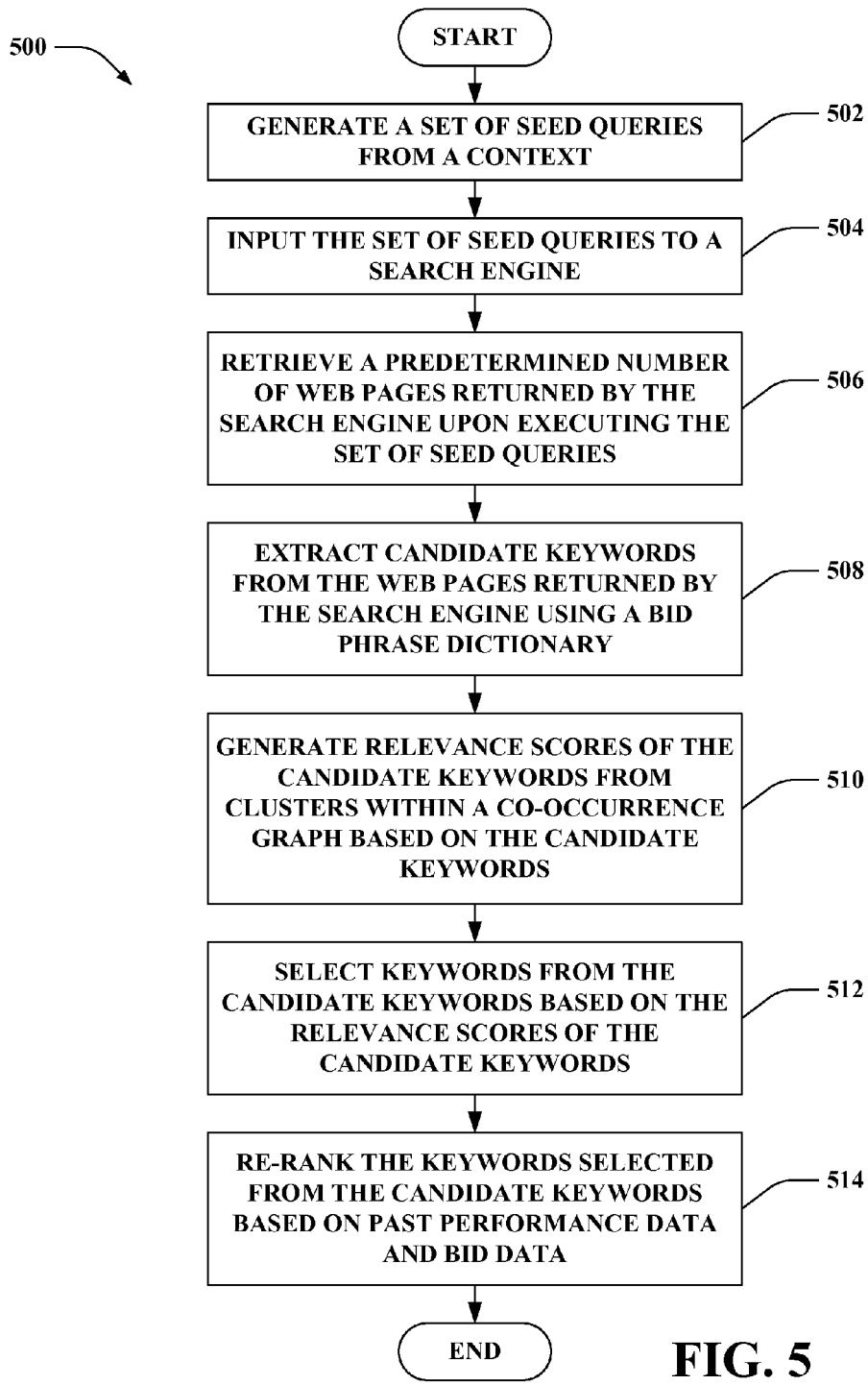
FIG. 5 is a flow diagram that illustrates an exemplary methodology of suggesting keywords for advertising relevant to a context.

FIGS. 4-5 illustrate exemplary methodologies relating to identifying keywords related to a context for advertising. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 4 illustrates a methodology 400 of identifying context dependent keywords for advertising. At 402, a set of seed queries can be identified from a context. The context can be a source keyword, a search query, a category, or a landing page, for instance. At 404, the set of seed queries can be inputted to a search engine. At 406, a predetermined number of web pages returned by the search engine upon executing the set of seed queries can be retrieved. At 408, candidate keywords can be extracted from the web pages returned by the search engine. At 410, keywords can be selected from the candidate keywords based on relevance scores of the candidate keywords.

Referring to FIG. 5, illustrated is a methodology 500 of suggesting keywords for advertising relevant to a context. At 502, a set of seed queries can be generated from a context. For example, the context can be a source keyword, a search query, a category, or a landing page. At 504, the set of seed queries can be inputted to a search engine. At 506, a predetermined number of web pages returned by the search engine upon executing the set of seed queries can be retrieved. At 508, candidate keywords can be extracted from the web pages returned by the search engine using a bid phrase dictionary. At 510, relevance scores of the candidate keywords can be generated from clusters within a co-occurrence graph based on the candidate keywords. At 512, keywords can be selected from the candidate keywords based on the relevance scores of the candidate keywords. At 514, the keywords selected from the candidate keywords can be re-ranked based on past performance data and bid data.

Figure 6:
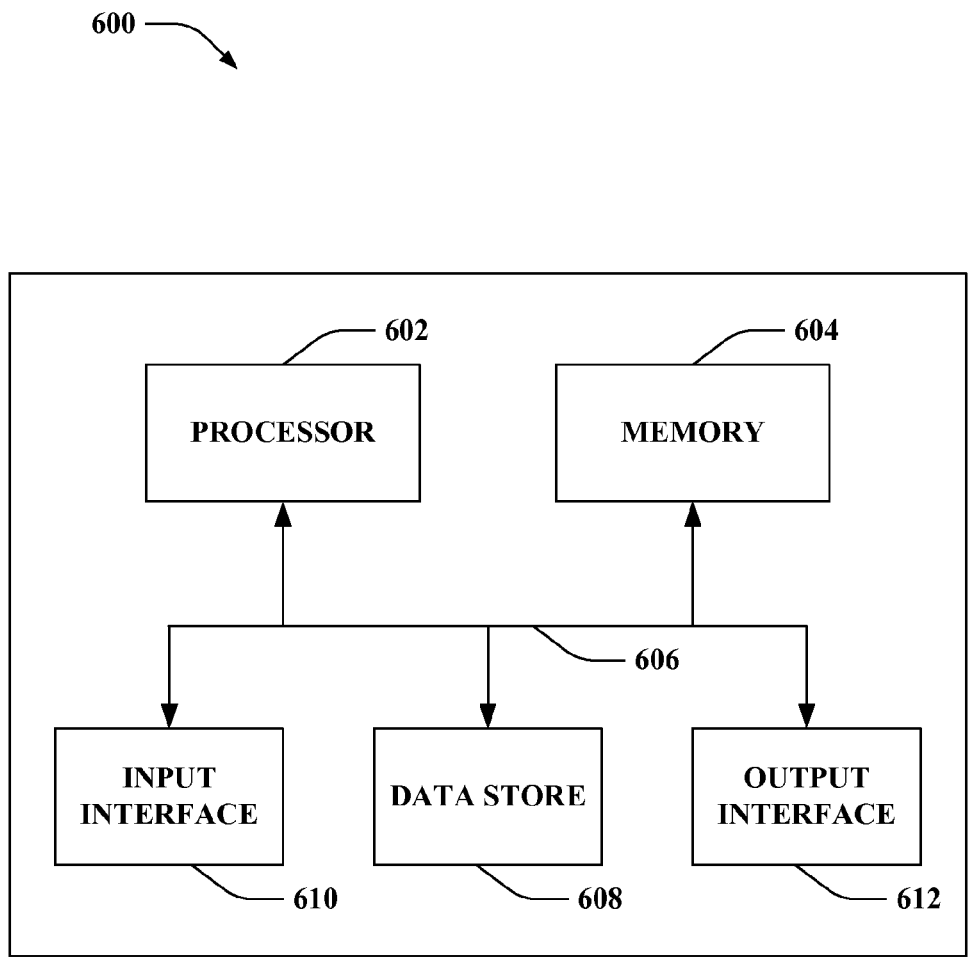
FIG. 6 illustrates an exemplary computing device.

Referring now to FIG. 6, a high-level illustration of an exemplary computing device 600 that can be used in accordance with the systems and methodologies disclosed herein is illustrated. For instance, the computing device 600 may be used in a system that identifies context dependent keywords for advertising. The computing device 600 includes at least one processor 602 that executes instructions that are stored in a memory 604. The instructions may be, for instance, instructions for implementing functionality described as being carried out by one or more components discussed above or instructions for implementing one or more of the methods described above. The processor 602 may access the memory 604 by way of a system bus 606. In addition to storing executable instructions, the memory 604 may also store contexts, seed queries, candidate keywords, keywords, past performance data, bid data, ad click through data, a stop word list, a stop phrases list, a bid phrase dictionary, and so forth.

The computing device 600 additionally includes a data store 608 that is accessible by the processor 602 by way of the system bus 606. The data store 608 may include executable instructions, contexts, seed queries, candidate keywords, keywords, past performance data, bid data, ad click through data, a stop word list, a stop phrases list, a bid phrase dictionary, etc. The computing device 600 also includes an input interface 610 that allows external devices to communicate with the computing device 600. For instance, the input interface 610 may be used to receive instructions from an external computer device, from a user, etc. The computing device 600 also includes an output interface 612 that interfaces the computing device 600 with one or more external devices. For example, the computing device 600 may display text, images, etc. by way of the output interface 612.

Additionally, while illustrated as a single system, it is to be understood that the computing device 600 may be a distributed system. Thus, for instance, several devices may be in communication by way of a network connection and may collectively perform tasks described as being performed by the computing device 600.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of suggesting context dependent keywords for advertising, comprising:
   identifying a set of seed queries from a context, wherein the context is one of a source keyword, a search query, a category, or a landing page;
   inputting the set of seed queries to a search engine;
   retrieving a predetermined number of web pages returned by the search engine upon executing the set of seed queries;
   extracting candidate keywords from the web pages returned by the search engine, wherein the candidate keywords are extracted by a processor of a computing device;
   evaluating relevance scores of the candidate keywords;
   selecting an expanded set of keywords from the candidate keywords based on the relevance scores of the candidate keywords, wherein the expanded set of the keywords are selected by the processor of the computing device;
   re-ranking the keywords in the expanded set selected from the candidate keywords based on past performance data and bid data; and
   selecting an advertisement for display based on the expanded set of the keywords as re-ranked based on the past performance data and the bid data.

2. The method of claim 1, wherein the context is the landing page, the landing page being a web page displayed after an advertisement is clicked by a user, and wherein identifying the set of seed queries from the context further comprises:
   extracting candidate keywords from the landing page;
   ranking the candidate keywords extracted from the landing page; and
   selecting, as the seed queries in the set, a top preset number of the candidate keywords extracted from the landing page as ranked.

3. The method of claim 1, wherein the context is the category, wherein a web page or an application is classified in the category, and wherein identifying the set of seed queries from the context further comprises:
   extracting phrases from a leaf node of the category;
   identifying search queries that correspond to the phrases based on ad click through data, wherein the ad click through data comprises search query—bid phrase pairs and corresponding numbers of clicks for the pairs; and
   selecting, as the seed queries in the set, a preset number of the search queries that correspond to the phrases based on the corresponding numbers of clicks.

4. The method of claim 1, further comprising extracting the candidate keywords from the web pages returned by the search engine using a stop word list.

5. The method of claim 4, wherein extracting the candidate keywords from the web pages returned by the search engine using the stop word list further comprises:
   parsing the web pages returned by the search engine;
   extracting text from the web pages;
   tokenizing the text from the web pages to obtain respective sequences of tokens for each of the web pages;
   for each token in the respective sequences:
     identifying whether the token is included in the stop word list;
     discarding the token when the token is identified as being included in the stop word list;
     forming possible phrases that start with the token when the token is identified as being omitted from the stop word list; and
     discarding the possible phrases having a last token that is included in the stop word list; and
   selecting the candidate keywords from the possible phrases that remain for the respective sequences.

6. The method of claim 1, further comprising extracting the candidate keywords from the web pages returned by the search engine using a bid phrase dictionary.

7. The method of claim 6, wherein extracting the candidate keywords from the web pages returned by the search engine using the bid phrase dictionary further comprises:
   parsing the web pages returned by the search engine;
   extracting text from the web pages;
   tokenizing the text from the web pages to obtain respective sequences of tokens for each of the web pages;
   for each token in the respective sequences:
     forming a possible phrase starting with the token;
     identifying whether the possible phrase is included in the bid phrase dictionary;
     selecting the possible phrase for inclusion in the candidate keywords when the possible phrase is identified as being included in the bid phrase dictionary; and
     when the possible phrase is identified as being omitted from the bid phrase dictionary, one of:
       forming a disparate possible phrase starting with the token having a shorter length; or
       moving to a next token to form a different possible phrase.

8. The method of claim 1, further comprising removing a subset of the candidate keywords that lack lexical similarity with the seed queries.

9. The method of claim 1, further comprising generating the relevance scores from clusters within a co-occurrence graph based on the candidate keywords.

10. The method of claim 1, wherein selecting the expanded set of the keywords from the candidate keywords based on the relevance scores of the candidate keywords further comprises:
constructing a co-occurrence graph based on the candidate keywords, wherein the co-occurrence graph comprises vertices that respectively represent the candidate keywords and edges between the vertices that respectively represent co-occurrence of candidate keyword pairs;
removing a subset of the edges that have weights below a threshold weight to form sub-graphs, wherein a weight of an edge between two vertices is a number of web pages in which particular candidate keywords represented by the two vertices co-occur;
detecting a subset of the sub-graphs with corresponding sub-graph densities above a threshold density;
evaluating the relevance scores of candidate keywords represented by vertices in the subset of the sub-graphs, wherein a relevance score of a given candidate keyword is a sum of discounted weights of edges from a vertex that represents the given candidate keyword; and
selecting the expanded set of the keywords from the candidate keywords represented by the vertices in the subset of the sub-graphs based on the relevance scores.

11. The method of claim 1, further comprising re-ranking the keywords in the expanded set selected from the candidate keywords as a function of a performance measure based score, a relevance score, and a bid density score.

12. The method of claim 1, wherein the predetermined number of web pages returned by the search engine comprise web pages returned by the search engine from a database that includes semi-structured data and web pages returned by the search engine from the World Wide Web.

13. The method of claim 1, further comprising generating supplemental keywords based on the expanded set of the keywords selected from the candidate keywords, the supplemental keywords being generated by selecting bid phrases from a bid phrase dictionary that are semantically related to the keywords in the expanded set selected from the candidate keywords.

14. A system that identifies context dependent keywords, comprising:
a processor; and
a memory that comprises components that are executable by the processor, the components comprising:
a query generation component that obtains a context, identifies a set of seed queries from the context, and inputs the set of seed queries into a search engine, wherein the context is one of a source keyword, a search query, a category, or a landing page;
an extraction component that retrieves a predetermined number of web pages returned by the search engine upon executing the set of seed queries and extracts candidate keywords from the web pages returned by the search engine, wherein the extraction component extracts the candidate keywords from the web pages returned by the search engine by identifying possible phrases from the web pages included in a bid phrase dictionary; and
a selection component that evaluates relevance scores of the candidate keywords and selects an expanded set of keywords from the candidate keywords based on relevance scores; and
a rank component that re-ranks the keywords in the expanded set selected by the selection component from the candidate keywords based on past performance data and bid data;
wherein a displayed advertisement is chosen based on the expanded set of the keywords as re-ranked.

15. The system of claim 14, wherein the selection component evaluates the relevance scores of the candidate keywords from clusters within a co-occurrence graph based on the candidate keywords.

16. A computer-readable storage medium including computer-executable instructions that, when executed by a processor, cause the processor to perform acts including:
generating a set of seed queries from a context, wherein the context is one of a source keyword, a search query, a category, or a landing page;
inputting the set of seed queries to a search engine;
retrieving a predetermined number of web pages returned by the search engine upon executing the set of seed queries;
extracting candidate keywords from the web pages returned by the search engine using a bid phrase dictionary;
generating relevance scores of the candidate keywords from clusters within a co-occurrence graph based on the candidate keywords;
selecting an expanded set of keywords from the candidate keywords based on the relevance scores of the candidate keywords;
re-ranking the keywords in the expanded set selected from the candidate keywords based on past performance data and bid data; and
selecting an advertisement for display based on the expanded set of the keywords as re-ranked based on the past performance data and the bid data.

* * * * *